Oct. 9, 1928.

A. T. PORTER 1,687,226

APPARATUS FOR PRODUCING OIL VAPOR

Filed Sept. 23, 1920      4 Sheets-Sheet 1

Oct. 9, 1928. 1,687,226
A. T. PORTER
APPARATUS FOR PRODUCING OIL VAPOR
Filed Sept. 23, 1920 4 Sheets-Sheet 3

Inventor
Alexander Thomas Porter
By his Attorneys
Williams & Pritchard

Oct. 9, 1928.  
A. T. PORTER  
1,687,226  
APPARATUS FOR PRODUCING OIL VAPOR  
Filed Sept. 23, 1920  
4 Sheets-Sheet 4

Patented Oct. 9, 1928.

1,687,226

UNITED STATES PATENT OFFICE.

ALEXANDER THOMAS PORTER, OF ELIZABETH, NEW JERSEY.

APPARATUS FOR PRODUCING OIL VAPOR.

Application filed September 23, 1920. Serial No. 412,301.

My invention relates to the art of vaporizing oil, and has for its object the production of an apparatus which will vaporize oil so that it will be in condition for use for power, heat or for any other purposes for which vaporized oils can be used.

My apparatus is particularly adapted for vaporizing hydrocarbon oils of a density greater than that of gasolene and for carrying out the method disclosed in my copending application Serial No. 166,639, filed May 5, 1917, renewed October 7, 1919, and now Patent 1,411,182. By the use of my apparatus I am able to successfully vaporize oils from the lighter oils down to heavier fuel oils having a density as low as 16 degrees Baumé.

I shall now describe the apparatus embodying my invention illustrated in the accompanying drawings and shall thereafter point out my invention in claim.

Figure 2:
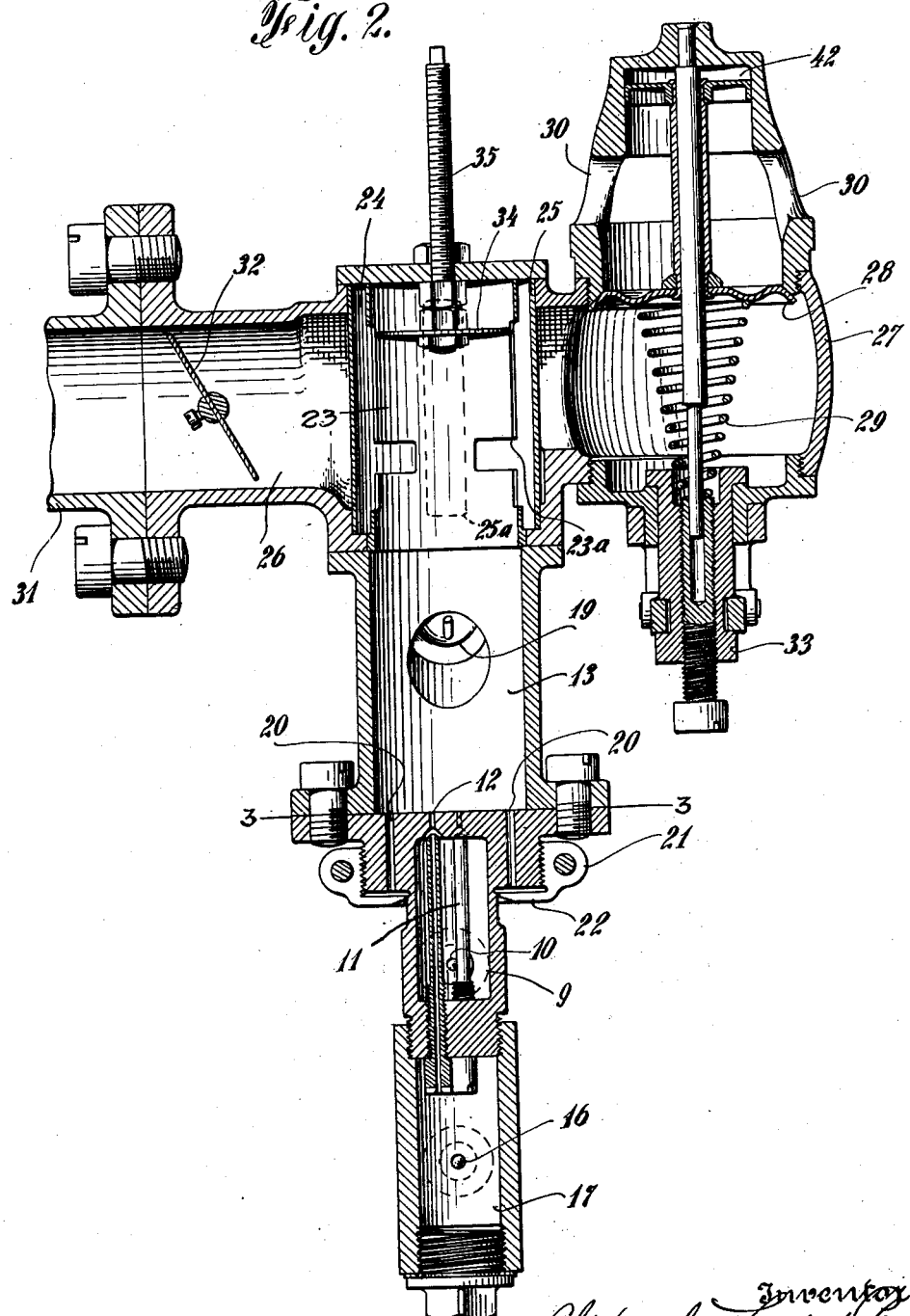
Figure 2 is a sectional view of my apparatus taken along the lines 2—2 of Figure 1.

In my apparatus the oil enters through the pipe 7, the valve 8, which is an ordinary needle valve, into the chamber 9, through the orifice 10, shown in Figure 2. The oil then flows around the atomizing nozzles 11 through the orifices 12 into the combustion chamber 13. The atomizing medium is admitted through the pipe 14, the valve 15, through the orifice 16, into the chamber 17, and then through the atomizing nozzles 11, and forces the oil in atomized condition into the chamber 13. On the side of the chamber 13 I provide a tubular extension 18, which I provide with a spark plug 19. This tubular extension 18 is placed at an upward angle from the chamber 13, so that none of the atomized spray will accumulate in the tubular extension 18. The spark plug 19 is provided with a usual ignition system, not shown, to ignite the atomized oil.

Figure 3:
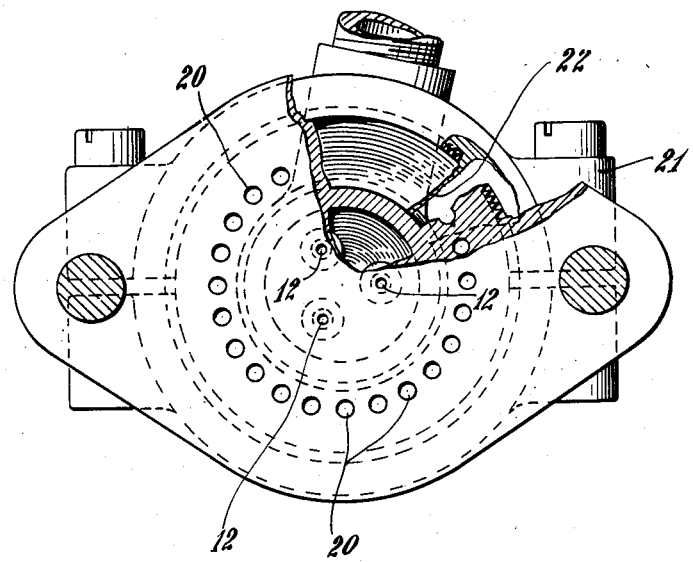
Figure 3 is an enlarged sectional view along the line 3—3 of Figure 2 of a portion of the apparatus, with parts broken away, showing the orifices through which the atomized oil is admitted, and the orifices through which the combustion air is admitted.
Figure 4:
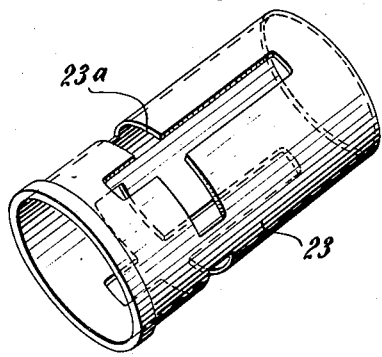
Figure 4 is a perspective view of a cylindrical baffle screen.
Figure 5:
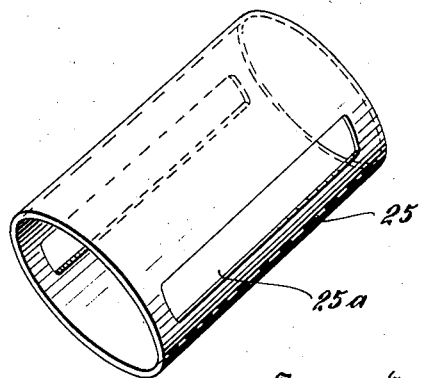
Figure 5 is a perspective view of a cylindrical baffle screen adapted to surround the baffle screen shown in Figure 4.

In my apparatus illustrated I have shown three openings 12, Figure 3, for admitting atomized oil. Any number may be used from one up, according to the capacity desired. In my modification (Figure 6) I prefer to employ thirty-six openings. The atomizing medium may be air, or may be carbon dioxide from the exhaust of an internal combustion engine, or it may be a non-combustible gas of any kind. The amount of air when air is used admitted through the atomizing orifices is not sufficient to support combustion. I therefore provide a series of openings 20, arranged annularly near the interior walls of the chamber 13. It is obvious that instead of using a series of openings 20, I could provide two or more slots in the form of an arc instead of the circular openings 20 as shown in my drawings. These openings may be to the outside atmosphere and are for the purpose of introducing any combustion supporting medium, preferably air. The amount of combustion supporting medium admitted through the orifices 20 is controlled by the split ring 21 which has a flange 22 adapted, when the ring is screwed upon the threads shown, to more or less restrict the passage of the air around the flanges 22 up through the orifices 20. By admitting the combustion supporting air through a series of annular openings arranged circumferentially near the inside wall of the chamber 13, I produce a stratified condition of the atomized oil so that that portion nearest the walls of the chamber 13 contains a greater amount of combustion supporting medium than that portion of the oil nearest the center so that the flame will be confined to the outermost portions of the atomized oil nearest to the inside surface of the vaporizing chamber 13. The chamber 13 is constructed of such a length as to permit only such portion of the atomized oil to be consumed as is necessary to vaporize all of the atomized oil furnished by the inlets 12. The vaporized fuel passes through the openings 23ᵃ in the baffle screen 23 around the annular passage 24 through the openings 25ᵃ in the cylindrical baffle screen 25 into the pipe 26 to the point where it is to be used.

The apparatus which I have illustrated is adapted for use on internal combustion engines, and consequently I have shown a means for supplying an additional amount of air to be mixed with the oil vapor so as to make a proper mixture for use in engines of this type. The cylinder 27 is provided with a usual valve 28, held against its seat by the spring 29. Air is drawn through the orifices 30 by the suction of the engine, the manifold of which is shown at 31, with sufficient force to open the valve 28 against the force of the spring 29. The air passes around the cylindrical baffle screen 25 past the openings 25$^a$ into the pipe 26. In its passage it is mixed with vaporized fuel coming through the openings 23$^a$ in the cylindrical baffle plate 23. I have provided the usual butterfly valve 32 to control the amount of vaporized fuel admitted to the engine. A mechanically operated plunger 33 is provided to increase the pressure on the spring 29 to hold the valve 28 more firmly seated when a richer mixture is desired, shutting off the air, either wholly or in part, admitted through the opening 30. I have provided a disc 34 on the end of a threaded rod 35 for the purpose of varying the length of the combustion chamber 13, and also to limit the size of the openings 23$^a$ through the cylindrical baffle screen 23. This enables me to control to a certain extent the distance the vaporized oil travels before the flame is extinguished by its passing through the baffle screen 23. The baffle screens 23 and 25 confine the vaporizing flame, which is maintained by the spark plug 19 and supported by the combustion supporting medium admitted through the orifices 20, to the chamber 13.

The needle valve 8 controlling the admission of the liquid fuel, and the needle valve 15 controlling the admission of the atomizing medium, are controlled by the levers 36 and 37 respectively which may be secured directly to the lever 38 or attached by means of links if desired. The butterfly valve 32 is also controlled by means of the lever 39 which may also be attached to the lever 38 so that, if desired, the supply of fuel admitted to the engine may be controlled by one lever. It is obvious that each lever may be independently operated if preferred. The plunger 33 is controlled by a crank 40, operated by a push lever 41. The valve 28 is retarded more or less in its operation by means of a dash pot 42.

Figure 1:
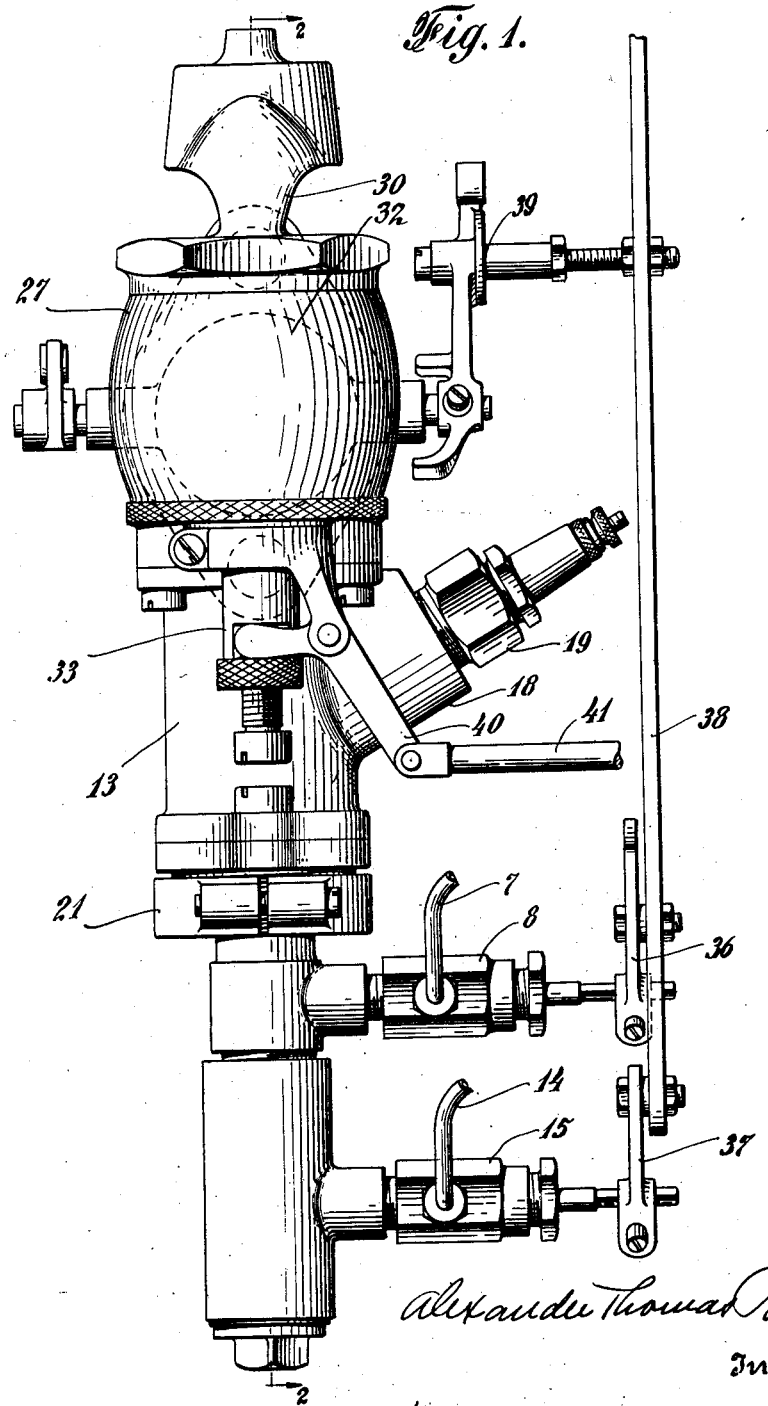
Figure 1 is a side elevation of my apparatus.
Figure 6:
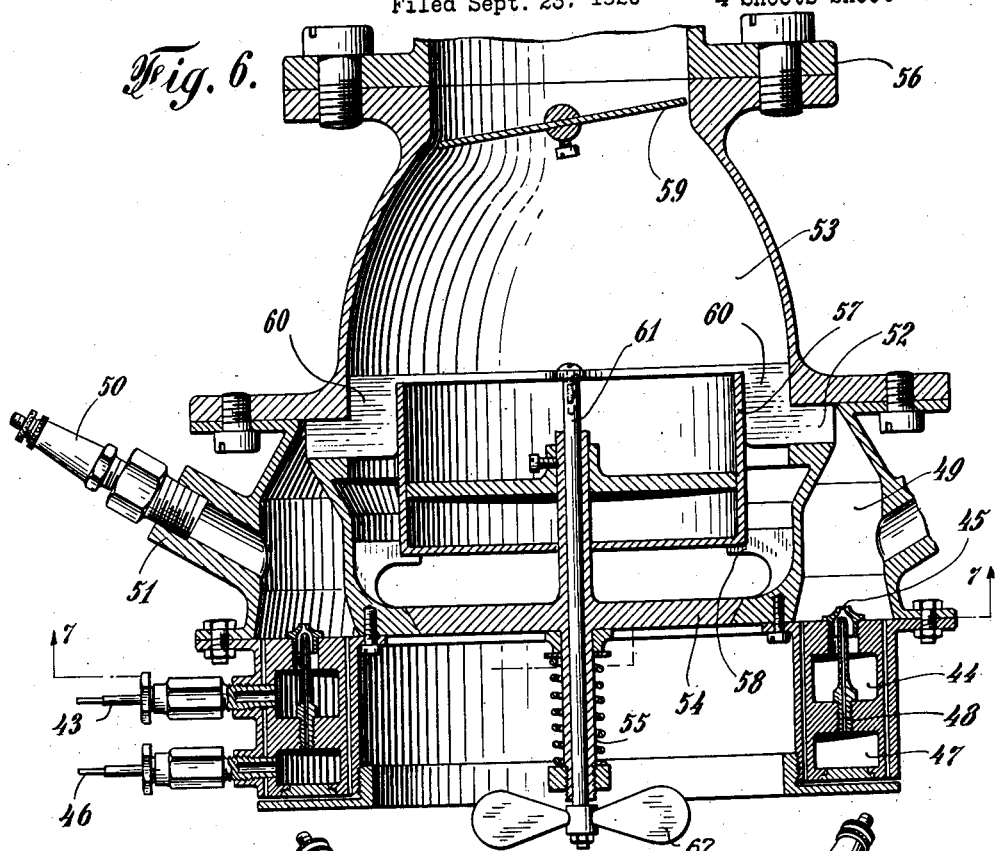
Figure 6 is a vertical central sectional view of a modified form of my apparatus.
Figure 7:
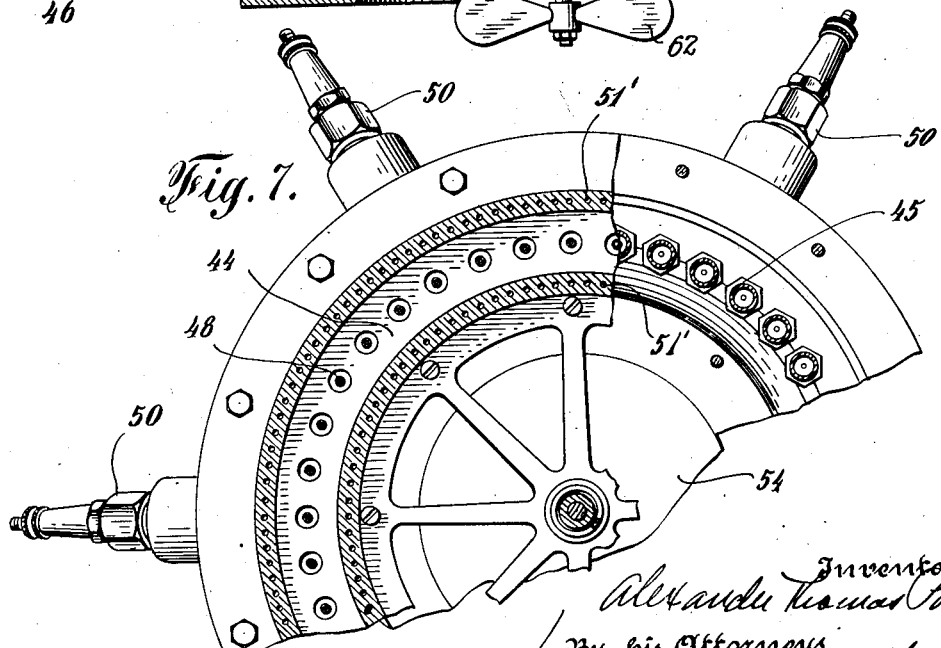
Figure 7 is a view of a section of the apparatus shown in Figure 6 along the line 7—7, showing the arrangement of atomizers and combustion air inlets.

Referring to the modification shown in Figure 6, the oil is admitted through the pipe 43 into the annular chamber 44 where it is distributed to the openings 45, preferably thirty-six of which are used. The atomizing medium is admitted to the pipe 46 and flows through the annular chamber 47 through the air nozzles 48, preferably thirty-six of which are used in this construction. The atomized oil passes into an annular vaporizing chamber 49. The vaporizing chamber in this construction has been provided preferably with six spark plugs 50, fitted into tubular projections 51 from the vaporizing chamber 49. While I have specified six of these spark plugs in this construction, the number may be varied to provide for simultaneously igniting the atomized oil through the entire vaporizing chamber. The combustion supporting medium is admitted through the series of openings 51' arranged in two annular rings to admit the combustion supporting air close to the walls of the vaporizing chamber and on either side of the openings 45 through which the atomized fuel is admitted. The arrangement of the combustion supporting air inlets are such that only such portion of the atomized fuel is consumed as is sufficient to vaporize the amount of oil supplied through the nozzles 45. The vaporized fuel passes up through the vaporizing chamber 49 through the opening 52 into the chamber 53. When used on internal combustion engines a valve 54, held by a spring 55, will be opened by the suction of the engine, the manifold of which is shown at 56. This will admit the necessary air for producing a mixture suitable for use in internal combustion engines. The action of the valve 54 is retarded by the use of a dash pot 57, supported on the spiders 58. I provide a butterfly valve 59 controlled in the usual manner to regulate the amount of vaporized fuel admitted to the engine. The butterfly valve may be operated in a similar manner to the butterfly valve 32 shown in Figure 2. The control also of the fuel and atomizing medium, through the valves 43 and 46, may be controlled similarly to the manner of the valves 8 and 15 shown in Figure 1. I provide a scraper 60 attached to a rod 61 to the end of which is a wing nut 62. This scraper is adapted to pass around the annular opening 52 to remove any carbon which might be deposited in this opening. This scraper is in the form of a blade and very thin and occupies only a small portion of the opening 52.

I will now give a very brief description of the operation of my apparatus.

The liquid fuel is admitted under pressure through the pipe 7, needle valve 8 into the chamber 9, through the opening 10, where it is atomized by the stream of atomizing medium, also under pressure, flowing through the pipe 14 into the valve 15 through the opening 16, chamber 17, through the atomizing nozzles 11. The fuel in atomized condition passes through the openings 12 into the vaporizing chamber 13. The pressure used in both instances will vary according to the viscosity of the fuel used. The amount of pressure necessary may be easily determined by a test.

The atomized fuel passing through the vaporizing chamber 13 receives an additional supply of combustion supporting air through the openings 20, which air has been admitted to the openings 20 through the space afforded between the complementary halves or sections of the split ring 21. The admission of combustion-supporting air near the inside wall of the chamber 13 forms a strata of atomized fuel of different degrees of combustibility. The atomized oil is ignited by means of the spark plug 19. As the atomized oil passes through the chamber 13, that portion of the atomized oil which has been ignited by the spark plug 19 causes the remainder of the atomized oil to become vaporized, in which condition it passes through the openings in the baffle screens 23 and 25 into the discharge pipe 26.

By my apparatus only a small portion of the atomized fuel is ignited and is consumed in the process of vaporizing the atomized oil.

The baffle screens 23 and 25 serve to confine the flame within the vaporizing chamber 13. When the device is used for internal combustion engines additional air is drawn through the openings 30 past the valve 28 around the screen 25 through the discharge passage 26 into the engine.

It is obvious that various modifications may be made without departing from the spirit and scope of my invention.

I claim:

An apparatus for vaporizing oil comprising an oil vaporizing chamber having a vapor exit opening, means for supplying oil to said chamber, means for supplying a combustion supporting medium circumferentially to said atomized oil, means for igniting that portion of said oil to which the combustion supporting medium has been supplied by said last-named means to produce a tubular form flame adapted to transform the unignited portion of the atomized oil into vapor adapted to escape from said chamber through the exit opening thereof, means for controlling the supply of combustion supporting medium, means for extinguishing said flame at the exit opening of said chamber, means for supplying a combustion supporting medium to said vapor after the same has passed from said chamber, means for regulating the supply of combustion supporting medium admitted to said vapor, the last-named means being in the form of a valve having spring tension means coacting therewith for retarding the operation thereof, and also a dash pot adapted to cooperate with the valve for further retarding its operation.

In testimony whereof, I have affixed my signature to this specification.

ALEXANDER THOMAS PORTER.